(12) United States Patent
Takeuchi et al.

(10) Patent No.: US 9,259,645 B2
(45) Date of Patent: Feb. 16, 2016

(54) STORAGE MEDIUM HAVING STORED THEREIN AN IMAGE GENERATION PROGRAM, IMAGE GENERATION METHOD, IMAGE GENERATION APPARATUS AND IMAGE GENERATION SYSTEM

(75) Inventors: Kiyoshi Takeuchi, Kyoto (JP); Koichi Hayashida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 19 days.

(21) Appl. No.: 13/484,980

(22) Filed: May 31, 2012

(65) Prior Publication Data

US 2012/0306868 A1    Dec. 6, 2012

(30) Foreign Application Priority Data

Jun. 3, 2011  (JP) ................... 2011-125864
Jun. 6, 2011  (JP) ................... 2011-126771

(51) Int. Cl.
| | |
|---|---|
| *A63F 13/20* | (2014.01) |
| *G06T 15/20* | (2011.01) |
| *H04N 13/00* | (2006.01) |
| *H04N 13/04* | (2006.01) |
| *A63F 13/40* | (2014.01) |

(52) U.S. Cl.
CPC ............... *A63F 13/06* (2013.01); *A63F 13/10* (2013.01); *G06T 15/20* (2013.01); *H04N 13/0014* (2013.01); *H04N 13/0409* (2013.01); *A63F 2300/105* (2013.01); *A63F 2300/204* (2013.01); *A63F 2300/301* (2013.01); *A63F 2300/6676* (2013.01); *G06T 2215/16* (2013.01)

(58) Field of Classification Search
USPC ........................................................ 345/419
See application file for complete search history.

(56) References Cited

U.S. PATENT DOCUMENTS

| | | | |
|---|---|---|---|
| 6,304,267 B1 | 10/2001 | Sata | |
| 2003/0179198 A1* | 9/2003 | Uchiyama | 345/427 |
| 2004/0042783 A1* | 3/2004 | Diana et al. | 396/427 |
| 2005/0130594 A1* | 6/2005 | Kowalski et al. | 455/66.1 |
| 2005/0174326 A1* | 8/2005 | Soh et al. | 345/156 |
| 2009/0244064 A1 | 10/2009 | Inokuchi et al. | |
| 2010/0053322 A1* | 3/2010 | Marti et al. | 348/135 |

(Continued)

FOREIGN PATENT DOCUMENTS

| | | |
|---|---|---|
| JP | H9-069023 | 3/1997 |
| JP | 2001-022344 | 1/2001 |

(Continued)

OTHER PUBLICATIONS

Microsoft, "Microsoft Combat Flight Simulator 3: Battle for Europe", Oct. 25, 2002.*

(Continued)

*Primary Examiner* — Ming Hon
*Assistant Examiner* — Yu-Jang Tswei
(74) *Attorney, Agent, or Firm* — Nixon & Vanderhye, P.C.

(57) ABSTRACT

When a game process is performed by an exemplary game apparatus having an LCD for displaying a stereoscopically visible image, angular velocities of rotations about axes of the game apparatus are detected by using an angular velocity sensor provided in the game apparatus. A stereoscopic effect of a stereoscopically displayed image is adjusted in accordance with a magnitude of a rotation angle of the game apparatus in a roll direction calculated based on the angular velocities of the rotations about axes of the game apparatus.

23 Claims, 9 Drawing Sheets

(56) References Cited

U.S. PATENT DOCUMENTS

| | | | |
|---|---|---|---|
| 2011/0090215 A1* | 4/2011 | Ohta | 345/419 |
| 2012/0176369 A1 | 7/2012 | Suzuki et al. | |

FOREIGN PATENT DOCUMENTS

| | | |
|---|---|---|
| JP | 2002-298160 | 10/2002 |
| JP | 2002-300612 | 10/2002 |
| JP | 2005-266293 | 9/2005 |
| JP | 2009-064356 | 3/2009 |
| JP | 2011-108256 | 6/2011 |
| WO | 2010/060211 | 6/2010 |
| WO | 2010061689 | 6/2010 |

OTHER PUBLICATIONS

SnapViews, "Snap Views—OFF Phase 2", Feb. 4, 2010.*
VmprHntrD "Top Gun: the Second Mission", Oct. 22, 2000.*
Atanas Boev, Mihail Georgiev, Atanas Gotchev, Nikolay Daskalov, Karen Egiazarian, "Optimized Visualization of Stereo Images on an OMAP Platform With Integrated Parallax Barrier Auto-Stereoscopic Display", 2009, Department of Signal Processing, Tampere University of Technology, 490-494.*
U.S. Appl. No. 13/048,245, filed Mar. 15, 2011, Corresponds to JP 2011-108256.
English machine translation of JP 2002-300612.
"Microsoft Combat Flight Simulator 3: Battle for Europe Screenshots for Windows", Oct. 16, 2005, retrieved from the internet on Aug. 23, 2014 at http://www.mobygames.com/game/windows/microsoft-combat-flight-simulator-3-battle-for-europe/screenshots/gameShotId, 130397/.
Office Action (10 pgs.) dated Aug. 28, 2014 issued in co-pending U.S. Appl. No. 13/485,156.
Office Action issued Feb. 17, 2015 in counterpart Japanese Patent Application No. 2011-125864.
English-language machine translation of JP2009-065356.
Office Action mailed Mar. 3, 2015 in counterpart Japanese Patent Application No. 2011-126711.
English-language machine translation of JPH9-069023.
English-language machine translation of JP2009-064356.
Office Action mailed Mar. 26, 2015 in U.S. Appl. No. 13/485,156.
"Quake Console Command Pages," http://www.neophi.com/home/dainelr/quake/console-all.html, as of Jul. 12, 1996, retrieved from the web on Mar. 15, 2015.
Advisory Action dated Aug. 18, 2015 in U.S. Appl. No. 13/485,156.
"Mouse Look Up and Down Doom Heretic Hexen and Quake Ect." https://www.youtube.com/watch?v=GUtas9pTNzc published online to You Tube on Aug. 12, 2012 with screen captures of software/video games released in 1993, 1994, 1995 and 2004 or earlier for Doom, Heretic, Hexen and Quake respectively.
Shaun Conlin, "D.I.P.R.I.P. Warm Up", posted to http://evergeek.com/GameReviews/3105.aspx on Oct. 15, 2008.
ZhiYing Zhou, Jefry Tedjokusumo, Stefan Winkler, and Bingbing Ni, "User Studies of a Multiplayer First Person Shooting Game with Tangible and Physical Interaction", posted to http://stefan.winklernet/Publications/Incs4563.pdf on Jun. 12, 2007.
"Real-Life Effects That Haven't Been Added to FPS's", posted to http://www.gamespot.com/forums/games-discussion1000000/real-life-effects-that-havent-been-added-to-fpss-26899889/ on Jun. 7, 2009.
"Instant Replay Problem (Changing the Camera Angle)", posted to http://forums.nba-live.com/viewtopic.php? f=52&t=42525 on Oct. 10, 2006.
"FIFA 11 iPhone—Instant Replay", posted to https://www.youtube.com/watch?v=A694pfDngEc on Sep. 30, 2010.
Jason W. Birzer, "Front Page Sports: Baseball '94 by Dynamix", posted to http://www.ibiblio.org/GameBytes/issue21/greviews/fpsbase.html on 1994.
Steven Drucker, Li-Wei He, Michael Cohen, Curtis Wong, and Anoop Gupta, "Spectator Games: A New Entertainment Modality for Networked Multiplayer Games", posted to http://research.microsoft.com/en-us/um/people/sdrucker/papers/spectator.doc on Aug. 15, 2000.
"FIFA Soccer 11: Instant Replay Zoom & Rotate'?", posted to http://www.gamefaqs.com/boards/988950-fifa-soccer-11/56895542/629265480 on Nov. 9, 2010.
Manual for EA Sports NHL '94, published to www.nhl94.com/ multimedia /manuals /NHL94_GEN.pdf.

* cited by examiner

F I G. 3
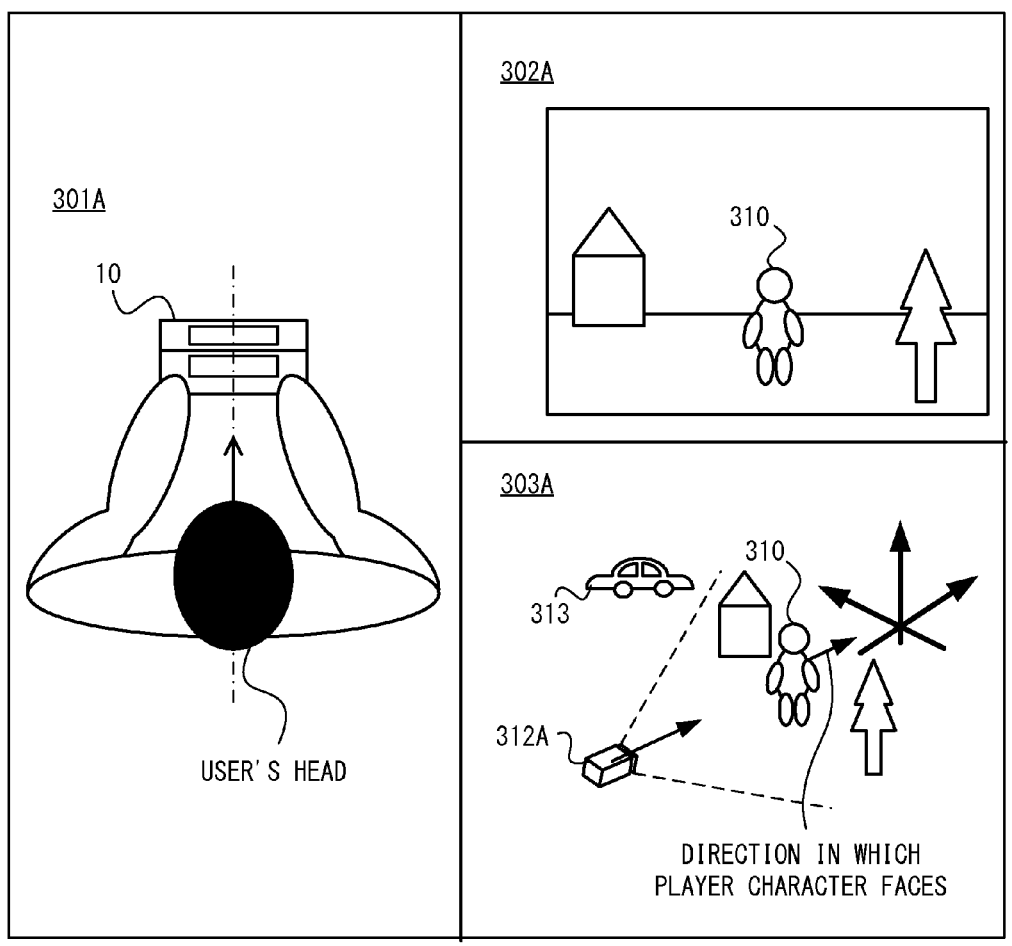

F I G. 5
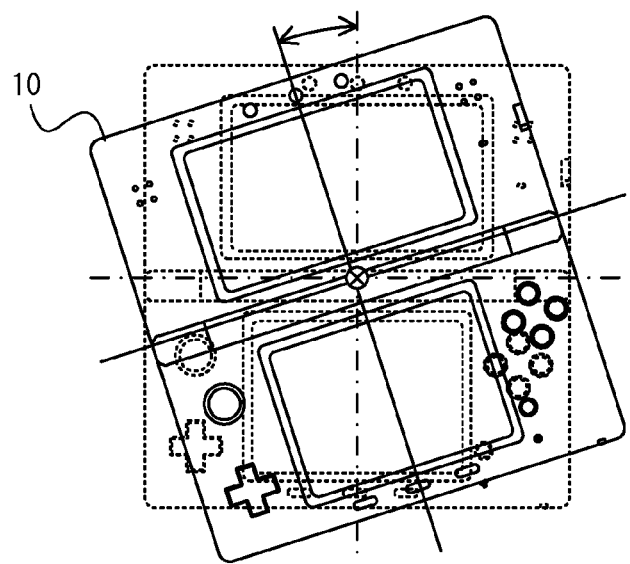
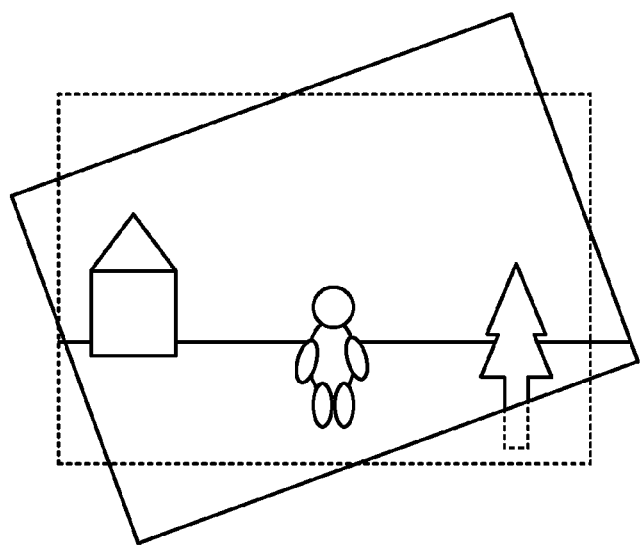

US 9,259,645 B2

STORAGE MEDIUM HAVING STORED THEREIN AN IMAGE GENERATION PROGRAM, IMAGE GENERATION METHOD, IMAGE GENERATION APPARATUS AND IMAGE GENERATION SYSTEM

CROSS REFERENCE TO RELATED APPLICATION

The disclosures of Japanese Patent Application No. 2011-125864, filed on Jun. 3, 2011, and Japanese Patent Application No. 2011-126771, filed Jun. 6, 2011, are incorporated herein by reference.

FIELD

The present application discloses a storage medium having stored therein an image generation program, an image generation method, an image generation apparatus, and an image generation system.

BACKGROUND AND SUMMARY

Some conventional hand-held game apparatuses are each provided with a gyro sensor. In a conventional hand-held game apparatus, when the game apparatus is moved by a user, a rotation angle based on the movement by the user is detected by using the gyro sensor. A virtual camera in a virtual space is moved in accordance with the detected rotation angle, and an image of a virtual object or the like in the virtual space is taken by the virtual camera, thereby generating an image. Thus, in the above game apparatus, a position of the virtual camera is moved by moving the hand-held game apparatus, and the virtual object viewed from various points of view can be displayed.

However, when the hand-held game apparatus described above includes a display device for displaying a stereoscopically visible image, visibility of stereoscopically visible images can be impaired in some cases.

Therefore, the present application discloses a storage medium having stored therein an image generation program, an image generation method, an image generation apparatus, and an image generation system which are capable of improving visibility.

The image generation program stored in the computer-readable storage medium according to the present application is executed on a computer of a display device including a display section for displaying a stereoscopically visible image. The image generation program causes the computer to execute: setting a virtual stereo camera in a predetermined virtual space; obtaining a stereoscopically visible image by using the virtual stereo camera; and activating camera control for controlling an orientation of the virtual stereo camera in accordance with an orientation of the display section. Furthermore, when the camera control is activated, the image generation program causes the computer to execute: receiving a predetermined activation operation performed by a user and activating the camera control based on the activation operation; obtaining, based on a reference orientation which is the orientation of the display section when the activation operation is received, a change amount of the orientation of the display section from the reference orientation as a display section orientation change amount; controlling the orientation of the virtual stereo camera based on the display section orientation change amount; adjusting, based on at least on a directional component in a roll direction of the display section orientation change amount, the virtual stereo camera so as to reduce a degree of stereoscopic effect of the image obtained by using the virtual stereo camera.

According to the above exemplary configuration, when the orientation of the display section is changed with respect to the directional component in the roll direction, the degree of stereoscopic effect is reduced so as to be smaller as a change amount of a rotation angle in the roll direction from the reference position is larger. Thereby, a situation in which stereoscopic display is not properly viewed can be prevented. Furthermore, the virtual stereo camera is controlled based on the change amount from the reference orientation which is a position of the display section when the activation operation is performed by the user. Consequently, in a case where the user performs the activation operation after the orientation of the virtual stereo camera is changed, the virtual stereo camera can be prevented from moving suddenly.

In another exemplary configuration, the image generation program may further cause the computer to execute controlling the virtual stereo camera so that the degree of stereoscopic effect becomes zero when the directional component in the roll direction of the display section orientation change amount exceeds a predetermined threshold for stereoscopic effect degree adjustment.

According to the above exemplary configuration, when a change in the orientation of the display section with respect to the directional component in the roll direction exceeds a certain value, an image with no stereoscopic effect is displayed. Thereby, a situation in which stereoscopic display is not properly viewed can be prevented.

In another exemplary configuration, the image generation program may further cause the computer to execute moving an object based on an operation performed by the user. At this time, the position of the virtual stereo camera may be set based on the position of the moved object.

In another exemplary configuration, the object may be moved also when the virtual camera control is activated.

According to the above exemplary configuration, the virtual stereo camera is set based on the position of the object. Accordingly, the virtual stereo camera can be set appropriately in accordance with the position of the object.

In another exemplary configuration, a change amount of the camera orientation may be limited.

According to the above exemplary configuration, the orientation of the virtual stereo camera is changed only within a predetermined range. Accordingly, a situation in which the user moves the apparatus vigorously and stereoscopic display is not properly viewed can be prevented.

According to the above, a storage medium having stored therein an image generation program, an image generation method, an image generation apparatus, and an image generation system which are capable of improving visibility can be provided.

These and other objects, features, aspects and advantages will become more apparent from the following detailed description when taken in conjunction with the accompanying drawings.

BRIEF DESCRIPTION OF THE DRAWINGS

FIG. 3 shows a non-limiting example of a usage of the game apparatus according to the exemplary embodiment and a display screen and a virtual space in the usage;

FIG. 5 shows a non-limiting example of a usage of the game apparatus according to the exemplary embodiment and a display screen and a virtual space in the usage;

DETAILED DESCRIPTION OF NON-LIMITING EXAMPLE EMBODIMENTS

External Structure of Game Apparatus

Figure 1:
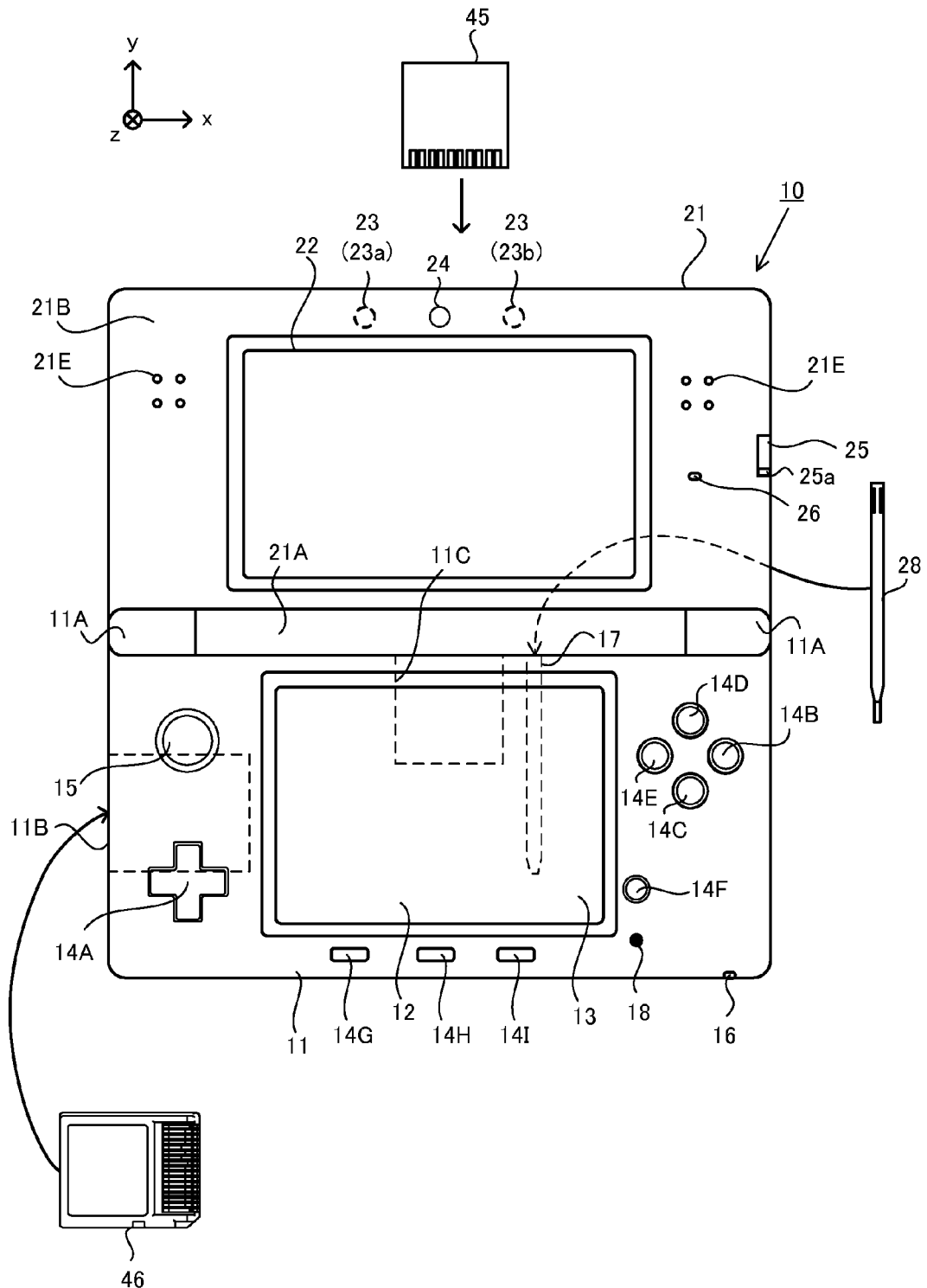
FIG. 1 shows a non-limiting example of an external configuration of a game apparatus according to an exemplary embodiment.

Hereinafter, a game apparatus according to an exemplary embodiment (first embodiment) will be described. FIG. 1 is a plan view illustrating an appearance of a game apparatus 10. The game apparatus 10 is a hand-held game apparatus and is configured to be foldable. FIG. 1 is a front view of the game apparatus 10 in an opened state. The game apparatus 10 is able to take an image by means of an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1. The game apparatus 10 includes a lower housing 11 and an upper housing 21 as shown in FIG. 1. The lower housing 11 and the upper housing 21 are connected to each other so as to be openable and closable (foldable).

(Description of Lower Housing)

Initially, a structure of the lower housing 11 will be described. As shown in FIG. 1, in the lower housing 11, a lower LCD (Liquid Crystal Display) 12, a touch panel 13, operation buttons 14A to 14I, an analog stick 15, an LED 16, an insertion opening 17, and a microphone hole 18 are provided. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 as described below. Although an LCD is used as a display device in the exemplary embodiment, any other display device such as a display device using an EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the exemplary embodiment, the touch panel 13 may be, but is not limited to, a resistive film type touch panel. A touch panel of any type such as electrostatic capacitance type may be used. In the exemplary embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14I are each an input device for making a predetermined input. As shown in FIG. 1, a cross button 14A (a direction input button 14A), a button 14B, a button 14C, a button 14D, a button 14E, a power button 14F, a selection button 14G, a HOME button 14H, and a start button 14I are provided on the inner side surface (main surface) of the lower housing 11. The cross button 14A is cross-shaped, and includes buttons for indicating an upward, a downward, a leftward, or a rightward direction. The buttons 14A to 14E, the selection button 14G, the HOME button 14H, and the start button 14I are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which slides parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone (see FIG. 2) is provided as a sound input device described below, and the microphone detects for a sound from the outside of the game apparatus 10.

Moreover, an L button 14J and an R button 14K are provided on the upper side surface of the lower housing 11, which are not shown. The L button 14J and the R button 14K act as, for example, shutter buttons (imaging instruction buttons) of the imaging section. Further, a sound volume button 14L is provided on the left side surface of the lower housing 11, which is not shown. The sound volume button 14L is used for adjusting a sound volume of a speaker of the game apparatus 10.

As shown in FIG. 1, a cover section 11B is provided on the left side surface of the lower housing 11 so as to be openable and closable. Inside the cover section 11B, a connector (not shown) is provided for electrically connecting between the game apparatus 10 and an external data storage memory 46. The external data storage memory 46 is detachably connected to the connector. The external data storage memory 46 is used for, for example, recording (storing) data of an image taken by the game apparatus 10.

Further, as shown in FIG. 1, an insertion opening 11C through which an external memory 45 having a game program stored therein is inserted is provided on the upper side surface of the lower housing 11. A connector (not shown) for electrically connecting between the game apparatus 10 and the external memory 45 in a detachable manner is provided inside the insertion opening 11C. A predetermined game program is executed by connecting the external memory 45 to the game apparatus 10.

Further, as shown in FIG. 1, a first LED 16 for notifying a user of an ON/OFF state of a power supply of the game apparatus 10 is provided on the lower side surface of the lower housing 11. Furthermore, a second LED (not shown) for notifying a user of an establishment state of a wireless communication of the game apparatus 10 is provided on the right side surface of the lower housing 11, which is not shown. The game apparatus 10 can make wireless communication with other devices, and the second LED is lit up when the wireless communication is established. The game apparatus 10 has a function of connecting to a wireless LAN in a method based on, for example, IEEE802.11.b/g standard. A wireless switch (not shown) for enabling/disabling the function of the wireless communication is provided on the right side surface of the lower housing 11 (not shown).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, these components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the exemplary embodiment, the upper LCD 22 is an LCD, a display device using an EL (Electro Luminescence), or the like may be used. In addition, a display device having any resolution may be used as the upper LCD 22.

The upper LCD 22 is a display device capable of displaying a stereoscopically visible image. Further, in the exemplary embodiment, an image for a left eye and an image for a right eye are displayed by using substantially the same display area. Specifically, the upper LCD 22 may be a display device using a method in which the image for a left eye and the image for a right eye are alternately displayed in the horizontal direction in predetermined units (for example, every other line). Alternatively, a display device using a method in which the image for a left eye and the image for a right eye may be alternately displayed in a time division manner may be used. Further, in the exemplary embodiment, the upper LCD 22 is a display device capable of displaying an image which is stereoscopically visible with naked eyes. A lenticular lens type display device or a parallax barrier type display device is used which enables the image for a left eye and the image for a right eye, which are alternately displayed in the horizontal direction, to be separately viewed by the left eye and the right eye, respectively. In the exemplary embodiment, the upper LCD 22 of a parallax barrier type is used. The upper LCD 22 displays, by using the image for a right eye and the image for a left eye, an image (hereinafter, referred to as a "stereoscopically visible image") which is stereoscopically visible with naked eyes. That is, the upper LCD 22 allows a user to view the image for a left eye with her/his left eye, and the image for a right eye with her/his right eye by utilizing a parallax barrier, so that a stereoscopically visible image exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopically visible display (stereoscopic display mode) for displaying a stereoscopic image which is stereoscopically visible and a planar view display (planar display mode) for displaying an image in a planar manner (for displaying a planar view image). The switching of the display is performed by a process performed by a CPU 311 or by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The viewing directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has a viewing direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. The 3D adjustment switch 25 is used for adjusting the stereoscopic effect of a stereoscopically visible image which is displayed on the upper LCD 22. However, as is apparent from the below description, an exemplary case will be described in which an image displayed on the upper LCD 22 is switched between a stereoscopically visible image and a planar view image, regardless of whether the 3D adjustment switch 25 is operated, in the exemplary embodiment.

The 3D indicator 26 indicates whether or not the upper LCD 22 is in the stereoscopic display mode. The 3D indicator 26 is implemented as a LED, and is lit up when the stereoscopic display mode of the upper LCD 22 is enabled. The 3D indicator 26 may be lit up only when the program processing for displaying a stereoscopically visible image is performed in a situation in which the upper LCD 22 is in the stereoscopic display mode. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 43 described below.

(Internal Configuration of Game Apparatus 10)

Figure 2:
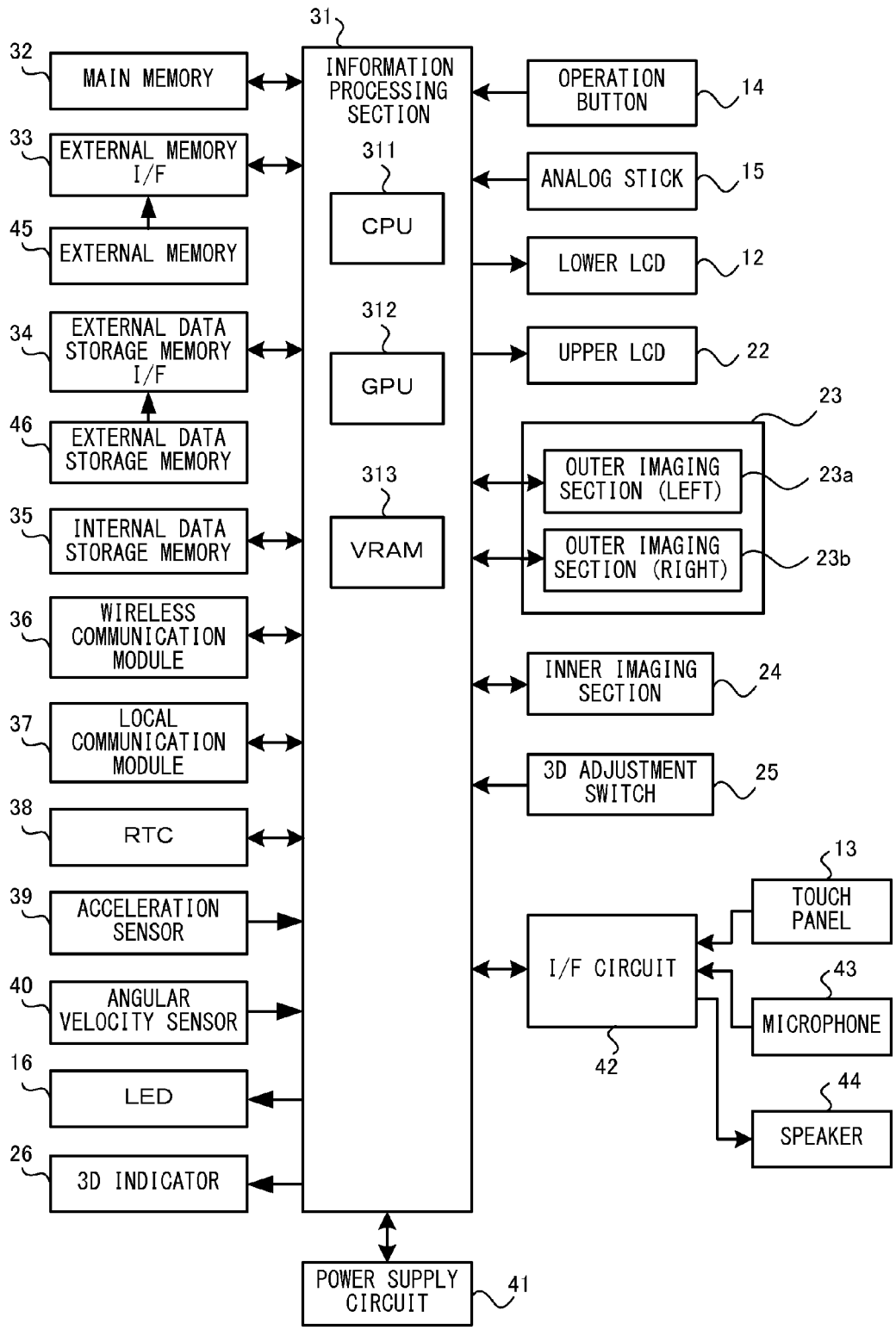
FIG. 2 shows a non-limiting example of an internal configuration of the game apparatus according to the exemplary embodiment.

Next, an internal electrical configuration of the game apparatus 10 will be described with reference to FIG. 2. FIG. 2 is a block diagram illustrating an internal configuration of the game apparatus 10. As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a program stored in a memory (for example, the external memory connected to the external memory I/F 33, or the internal data storage memory 35) in the game apparatus 10, to execute a process based on the program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for (the CPU 311 of) the information processing section 31. That is, the main memory 32 temporarily stores various types of data used for the process based on the program described above, and temporarily stores a program acquired from the outside (the external memory 45, another device, or the like), for example. In the exemplary embodiment, for example, a PSRAM (Pseudo-SRAM) is used as the main memory 32.

The external memory 45 is nonvolatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed. The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, a communication based on an independent protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The RTC 38 and the power supply circuit 40 are connected to the information processing section 31. The RTC 38 counts time and outputs the counted time to the information processing section 31. The information processing section 31 calculates a current time (date) based on the time counted by the RTC 38.

The acceleration sensor 39 is connected to the information processing section 31. The acceleration sensor 39 detects magnitudes of accelerations (linear accelerations) in the directions of the straight lines along the three axial (xyz axial) directions, respectively. The acceleration sensor 39 is provided inside the upper housing 21. In the acceleration sensor 39, as shown in FIG. 1, the long side direction of the upper LCD 22 is defined as x axial direction, the short side direction of the upper LCD 22 is defined as y axial direction, and the direction orthogonal to the inner side surface of the upper LCD 22 is defined as z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and detect an orientation and a motion of the game apparatus 10.

An angular velocity sensor 40 is connected to the information processing section 31. The angular velocity sensor 40 detects angular velocities around the three axes (xyz-axes in the exemplary embodiment) of the upper LCD 22, and outputs, to the information processing section 31, data (angular velocity data) representing the angular velocities having been detected. The angular velocity sensor 40 is provided inside the lower housing 11, for example. The information processing section 31 receives the angular velocity data outputted by the angular velocity sensor 40, and calculates an orientation and a motion of the upper LCD 22.

As described above, the orientation and the motion of the upper LCD 22 are calculated by the acceleration sensor 39 and the angular velocity sensor 40. The long side direction, the short side direction, and the direction orthogonal to the display screen of the upper LCD 22 coincide with the long side direction, the short side direction and the direction orthogonal to the inner side surface (main surface) of the upper housing 21, respectively. Consequently, an orientation and a motion of the upper LCD 22 coincide with an orientation and a motion of the upper housing 21 which fixedly accommodates the upper LCD. In the following description, obtaining an orientation and a motion of the game apparatus is the same meaning as obtaining an orientation and a motion of the upper LCD 22.

The power supply circuit 41 controls power to be supplied from a power supply (the rechargeable battery accommodated in the lower housing 11) of the game apparatus 10, and supplies power to each component of the game apparatus 10.

The I/F circuit 42 is connected to the information processing section 31. The microphone 43 and the speaker 44 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies the sound signal outputted from the I/F circuit 42, and a sound is outputted from the speaker 44. The touch panel 13 is connected to the I/F circuit 42. The I/F circuit 42 includes a sound control circuit for controlling the microphone 43 and the speaker 44 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position, on an input surface of the touch panel 13, on which an input is made.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14L has been pressed. The information processing section 31 acquires the operation data from the operation button 14 to perform a process in accordance with the input on each of the operation buttons 14A to 14L. The CPU 311 acquires the operation data from the operation button 14 every predetermined time.

The lower LCD 12 and the upper LCD 22 are connected to the information processing section 31. The lower LCD 12 and the upper LCD 22 each display an image in accordance with an instruction from (the GPU 312 of) the information processing section 31. In the exemplary embodiment, the information processing section 31 causes the upper LCD 22 to display a stereoscopic image (stereoscopically visible image).

Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye, which are stored in the VRAM 313 of the information processing section 31, are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. In the exemplary embodiment, the parallax barrier is constantly set to be ON. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and data of the taken images are outputted to the information processing section 31.

The 3D adjustment switch 25 is connected to the information processing section 31. The 3D adjustment switch 25 transmits, to the information processing section 31, an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode. The game apparatus 10 has the internal configuration as described above.

[Outline of Information Processing]

In the following, an outline of information processing according to the exemplary embodiment will be described with reference to FIGS. 3, 4, and 5. In the exemplary embodiment, a game process performed by the game apparatus 10 will be described as an example of the information processing.

In the game process according to the exemplary embodiment, a game is advanced by a player moving a player object that appears in a virtual game space within the virtual game space by using operation means of the game apparatus 10. For example, when the analog stick 15 is tilted upward, the player object moves farther in a depth direction in the virtual space. When the analog stick 15 is tilted downward, the player object moves forward in the depth direction in the virtual space. An orientation (direction) of the player object is controlled so that the forward direction of the player object faces in a direction designated by the analog stick 15. Further, the player object can be caused to perform a motion such as a jumping motion by operating another operation means (a button, a touch panel, and the like); however, a detailed description thereof is omitted here.

When the game process according to the exemplary embodiment is performed, a process of positioning a virtual stereo camera in the virtual game space is performed. Then, the virtual game space is captured by using the positioned virtual stereo camera, thereby generating an image to be displayed on the screen of the game apparatus. The virtual stereo camera includes a right virtual camera and a left virtual camera. The virtual cameras each capture the virtual game space and generate an image for a right eye and an image for a left eye, respectively. Thereby the virtual game space is stereoscopically displayed on the display means 22 by using these images.

In the exemplary embodiment, a position and an orientation of the virtual stereo camera are set based on a position and an orientation of the player object. Specifically, the virtual stereo camera is positioned at a position such that the virtual stereo camera captures the player object from behind and in an orientation such that its viewing direction faces a direction of the player object. As described above, the orientation of the player object is controlled based on a predetermined operation (an operation of the analog stick 15 in the exemplary embodiment) performed by the user. Accordingly, the orientation of the virtual stereo camera is changed in accordance with the predetermined operation performed by the user.

Further, in the exemplary embodiment, when the virtual stereo camera is positioned in the virtual game space, firstly, a virtual camera which acts as a reference virtual camera is set based on the position and the orientation of the player object. Then, based on the set reference virtual camera, the left virtual camera and the left virtual camera are positioned. Although specific processes will be described later, the reference virtual camera moved in the left direction (in the x-axis positive direction) and the reference virtual camera moved in the right direction (in the x-axis negative direction) in a reference virtual camera coordinate system are used as the left and the right virtual cameras, respectively.

As described above, the position and the orientation of the virtual stereo camera are changed in accordance with the position and the orientation of the player object based on an operation of the analog stick 15. In the game process according to the exemplary embodiment, the orientation of the virtual stereo camera can be changed by changing an orientation of the game apparatus in a real space. The control of the orientation of the virtual camera based on the orientation of the game apparatus is referred to as "apparatus orientation follow-up control." More specifically, when the player performs a predetermined operation by using the operation means of the game apparatus 10, the apparatus orientation follow-up control is activated. In the exemplary embodiment, an operation of pressing the R button 14K is the "predetermined operation." While the R button 14K is being pressed, the control is in a virtual camera control mode, and the virtual camera can be operated. When the R button 14K is released, the control is in a normal mode, and the virtual camera is not moved even if the orientation of the game apparatus is changed. The apparatus orientation follow-up control may be maintained when the R button 14K is pressed and then released.

Figure 4:
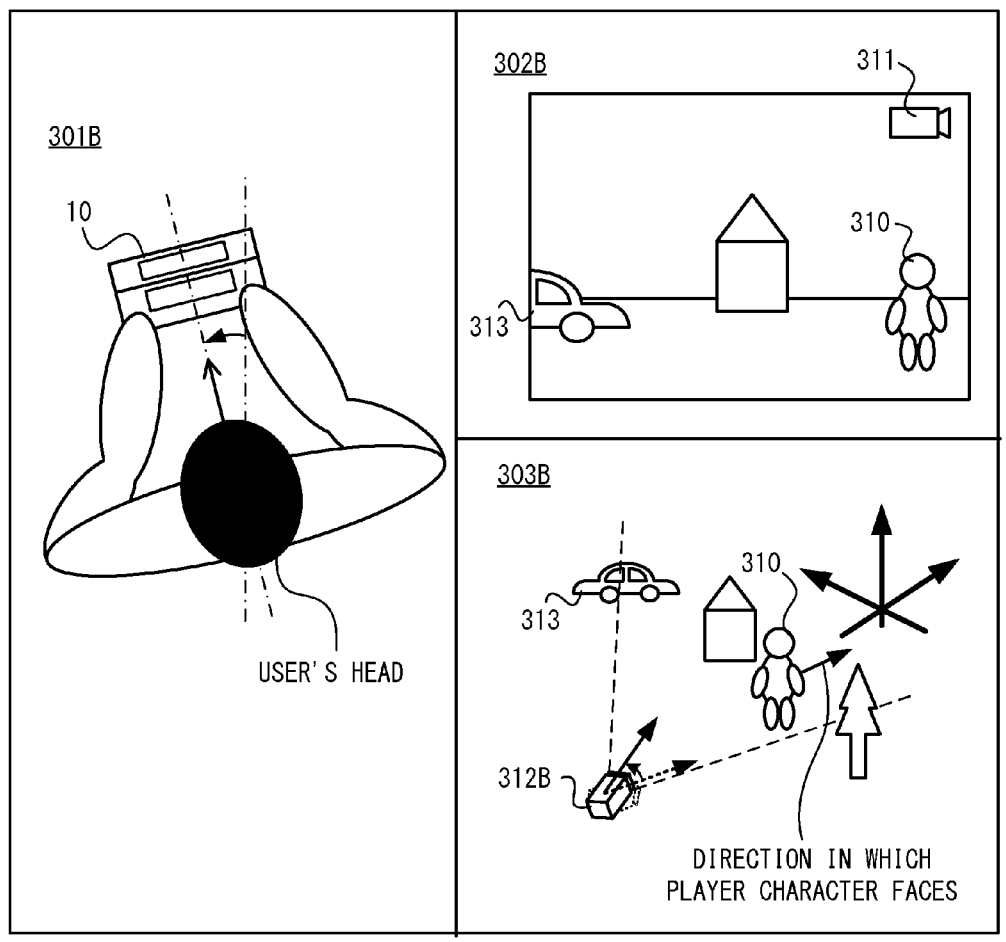
FIG. 4 shows a non-limiting example of a usage of the game apparatus according to the exemplary embodiment and a display screen and a virtual space in the usage.

FIG. 3 and FIG. 4 each show how the virtual stereo camera is operated by moving the game apparatus 10. It should be noted that, in reality, the virtual stereo camera includes two virtual cameras which are the left virtual camera and the right virtual camera and a stereoscopic image is displayed on the screen. However, for ease of illustration, a single virtual camera is provided and a planar image is displayed on the screen in each of FIG. 3 and FIG. 4. FIG. 3 shows a play situation 301A in a normal state (a state in which the R button 14K is not pressed), an image 302A to be displayed on the screen, and a state 303A of objects and the virtual camera in the virtual game space in the situation 301A. As shown in the state 303A, in the normal state, a virtual camera 312A is positioned so as to capture a player object 310 from directly behind and an image in which the player object 310 is positioned in the middle in the horizontal direction is displayed on the screen. FIG. 4 shows a situation 301B when the R button 14K is pressed in the state of FIG. 3 and the game apparatus is rotated in a leftward direction, an image 302B to be displayed on the screen, and a state 303B of the objects and the virtual camera in the virtual game space in the situation 301B. At this time, the apparatus orientation follow-up control is activated by the R button 14K being pressed, and an image 311 indicating that the apparatus orientation follow-up control is activated is displayed on the screen. While the apparatus orientation follow-up control is activated, the virtual camera can be moved in accordance with the orientation of the game apparatus. In FIG. 4, the game apparatus is rotated in the leftward direction after the apparatus orientation follow-up control is activated (while the R button 14K is being pressed), and a virtual camera 312B rotates in the leftward direction in the same manner. Consequently, a viewing direction of the virtual camera 312B shifts in the leftward direction so as to capture a range shifted in the leftward direction from the range which the virtual camera 312B has originally captured. Thus, an object 313 which has been present in the leftward direction from the player object and has not been displayed on the screen is displayed on the screen.

In the state of FIG. 4, the apparatus orientation follow-up control is inactivated when the R button 14K is released. At this time, the orientation of the virtual camera returns to that as shown in 303A automatically without returning the orientation of the game apparatus to the state of 301A, and the image being displayed on the screen becomes the same as 302A.

A change in the orientation of the game apparatus is represented as change about the x-axis (in a tilt direction), change about the y-axis (in a pan direction), and change about the z-axis (in a roll direction). With reference to FIG. 3 and FIG. 4, a case where the orientation of the game apparatus is changed about the y-axis has been described. Although detailed description is omitted here, also when the game apparatus is rotationally moved about the x-axis, the orientation of the virtual camera changes in accordance with the orientation of the game apparatus in the same manner as when the game apparatus is rotationally moved about the y-axis.

Further, also when the orientation of the game apparatus is changed about the z-axis, the orientation of the virtual camera changes in accordance with the orientation of the game apparatus. FIG. 5 shows a situation 401 in which the game apparatus is tilted and an image 402 to be displayed on the screen in the situation 401. When the apparatus orientation is changed about the z-axis, the viewing direction of the virtual camera does not change, and the virtual camera is rotated about the viewing direction thereof as an axis. At this time, an image as shown in the image 402 which is tilted with respect to the game apparatus is displayed on the screen. When the game apparatus is in the state shown in 401, the display means displaying the image is tilted with respect to the user. Consequently, the user views the objects such as the player object in the virtual game space at the same angle as before the game apparatus is tilted.

In the exemplary embodiment, a unit of the angle relative to each axis which is calculated based on the angular velocity of the rotation about each axis having been detected by the angular velocity sensor 40 is preset so as to be equivalent to a unit of an angle relative to each axis of the virtual space. Therefore, in the exemplary embodiment, the rotation angle relative to each axis calculated based on the angular velocity of the rotation about each axis detected by the angular velocity sensor 40 can be used, as it is, as a rotation angle for changing the orientation of the virtual camera.

In the exemplary embodiment, a range of changing the orientation of the virtual camera about each of the x-axis (in the tilt direction) and the y-axis (in the pan direction) is limited. Specifically, the orientation of the virtual camera can be changed within a range that does not allow the viewing direction of the virtual camera to deviate greatly from the player object. For example, in a case where the game apparatus is further rotated in the leftward direction in the state shown in FIG. 4 while the apparatus orientation follow-up control is active (while the R button 14K is kept pressed), if the virtual camera is rotated in the leftward direction in the same manner as the game apparatus, the player object may deviate from a viewing range of the virtual camera and will not be displayed on the screen. For this reason, even if the game apparatus is further rotated in the leftward direction in the state shown in FIG. 4, the virtual camera is not rotated further from the state of FIG. 4 and the image displayed on the screen does not change from the state of FIG. 4.

Meanwhile, when the orientation of the game apparatus is changed about the z-axis (in the roll direction), unlike the change about each of the x-axis (in the tilt direction) and y-axis (in the pan direction), there is no limit on the range of changing the orientation of the virtual camera. However, when the orientation of the game apparatus is changed about the z-axis (in the roll direction), the following situation may occur. Naked eye stereoscopic display means used in the exemplary embodiment displays a stereoscopically visible image by allocating an image for a right eye and an image for a left eye so that the image for a right eye is viewed only by the user's right eye and the image for a left eye is viewed only by the user's left eye. Normally, when the user and the display means face each other (when the up-down direction of the user coincides with the up-down direction of the display means), an image can be stereoscopically viewed. If the display means is rotated about the z-axis, the up-down direction of the user is shifted from the up-down direction of the display means. Consequently, the image for a right eye is viewed also by the left eye and the image for a left eye is viewed also by the right eye, and the user cannot view an image stereoscopically. In this situation, a slight change in the orientation of the game apparatus can frequently switch between states in which the image for a right eye is viewed, the image for a left eye is viewed, and both of the images are viewed at the same time. As a result, if a parallax between the image for a right eye and the image for a left eye is too large, two images which are greatly different from each other are viewed alternately. This causes the user to view a blurred image which is difficult to view.

For this reason, in the exemplary embodiment, when the virtual camera is rotated about an axis orthogonal to the upper LCD 22 (about the z-axis) in accordance with change in the orientation of the game apparatus, the virtual camera is controlled simultaneously so that a parallax (that is, a degree of stereoscopic effect) between the image for a right eye and the image for a left eye becomes small. Specifically, respective positions of the right virtual camera and the left virtual camera are changed so that greater the rotation angle in the roll direction is, the smaller a virtual stereo camera distance (a distance between the right virtual camera and the left virtual camera) becomes. In the exemplary embodiment, a virtual stereo camera distance is controlled so that the virtual stereo camera distance becomes zero (that is, the degree of stereoscopic effect becomes zero) when the virtual camera is tilted by 25 degrees in the roll direction from a reference virtual camera orientation. When the virtual camera is tilted by an angle greater than 25 degrees, the virtual stereo camera distance stays zero. In this case, the image for a right eye is identical to the image for a left eye, and thus an image is displayed in a planar manner on the display means.

[Data to be Stored in Main Memory]

Next, data to be stored in the main memory 32 in accordance with the game program being executed by the CPU 311 will be described with reference to FIG. 6 prior to description of a specific operation performed by the CPU 311 of the game apparatus 10. The game program is stored in a predetermined storage medium attachable to the game apparatus 10 or in a nonvolatile memory in the game apparatus 10, and is loaded into the main memory and then executed.

Figure 6:
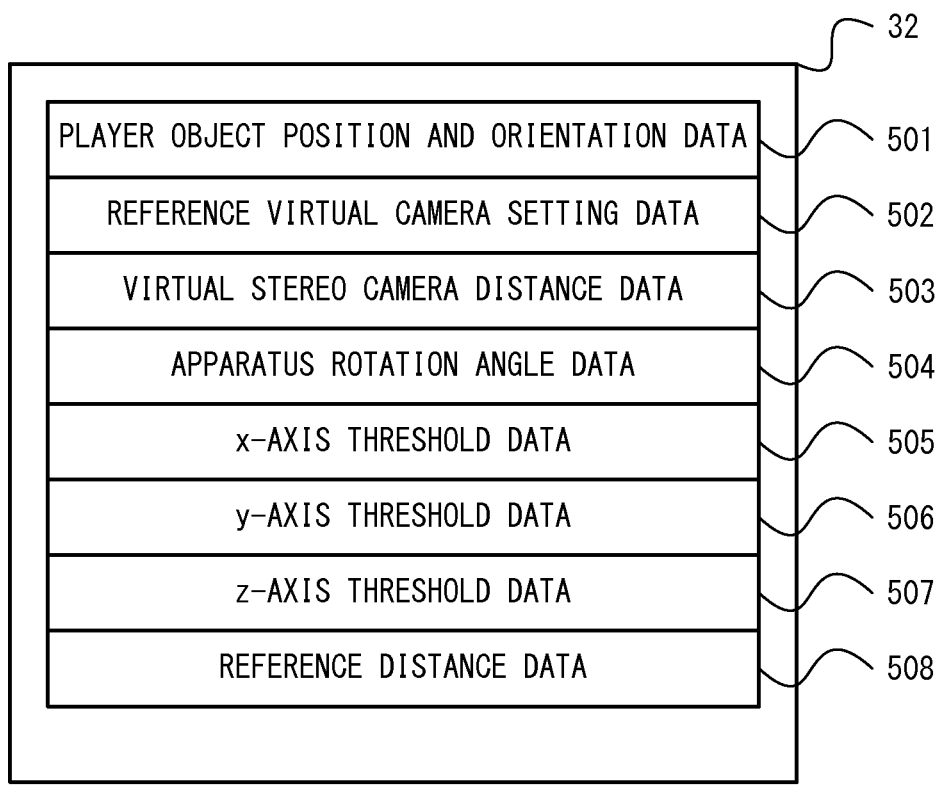
FIG. 6 shows a non-limiting example of a memory map in the exemplary embodiment.

As shown in FIG. 6 by way of example, player object position and orientation data 501, reference virtual camera setting data 502, virtual stereo camera distance data 503, apparatus rotation angle data 504, x-axis threshold data 505, y-axis threshold data 506, z-axis threshold data 507, and reference distance data 508 are stored in the main memory 32. The player object position and orientation data 501, the reference virtual camera setting data 502, the virtual stereo camera distance data 503, and the apparatus rotation angle data 504 are data which are generated by the CPU 311 executing the game program. The x-axis threshold data 505, the y-axis threshold data 506, the z-axis threshold data 507, and the reference distance data 508 are data which are contained in the game program.

The player object position and orientation data 501 represents a position and an orientation of the player object in the virtual game space. The position of the player object is represented by coordinates with respect to xyz-axis directions in a world coordinate system representing the virtual space and the orientation of the player object is represented by respective angles relative to the xyz axes.

The reference virtual camera setting data 502 represents a setting of the reference virtual camera and contains information of a position and an orientation of the reference virtual camera. The position of the reference virtual camera is represented by coordinates with respect to the xyz-axis directions in the world coordinate system representing the virtual space and the orientation of the reference virtual camera is represented by respective angles relative to the xyz axes. Further, the reference virtual camera setting data 502 contains information of a viewing angle, a near clip plane, a far clip plane, and the like of the reference virtual camera.

The virtual stereo camera distance data 503 represents a distance between the right virtual camera and the left virtual camera. The reference distance data 508 represents a reference value of the distance between the right virtual camera and the left virtual camera.

As will be described later, the value of the virtual stereo camera distance data 503 is set based on the reference value represented by the reference distance data 508.

The x-axis threshold data 505 and the y-axis threshold data 506 are used in a later-described virtual stereo camera setting update process and each represent threshold data to be used when determining how to adjust the orientation of the reference virtual camera.

The z-axis threshold data 507 is used in the later-described virtual stereo camera setting update process and represents threshold data to be used when determining how to adjust a virtual stereo camera distance.

[Game Process]

Figure 7:
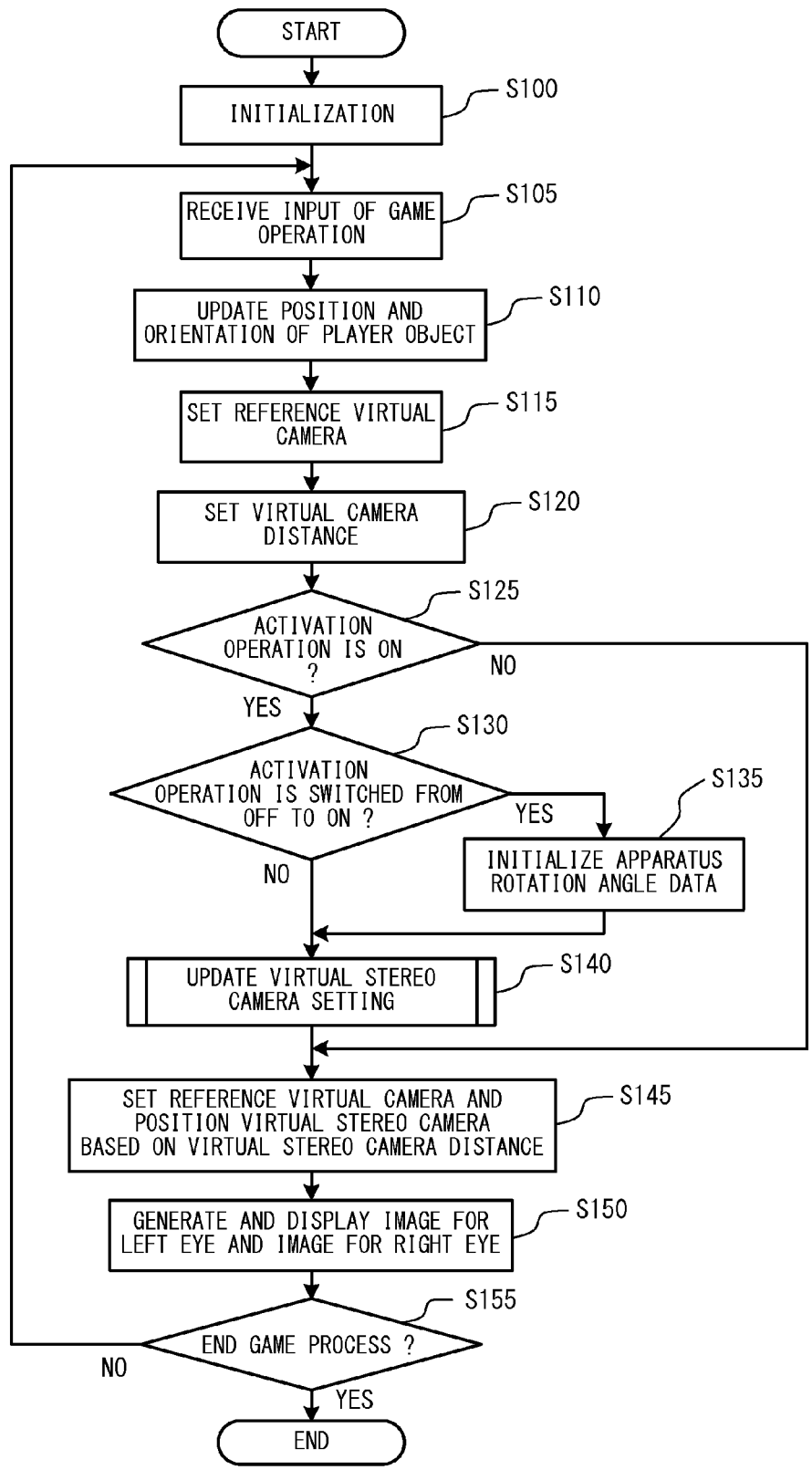
FIG. 7 shows a non-limiting example of a flow chart of a display control process performed by a CPU of the game apparatus according to the exemplary embodiment executing an information processing program.
Figure 8:
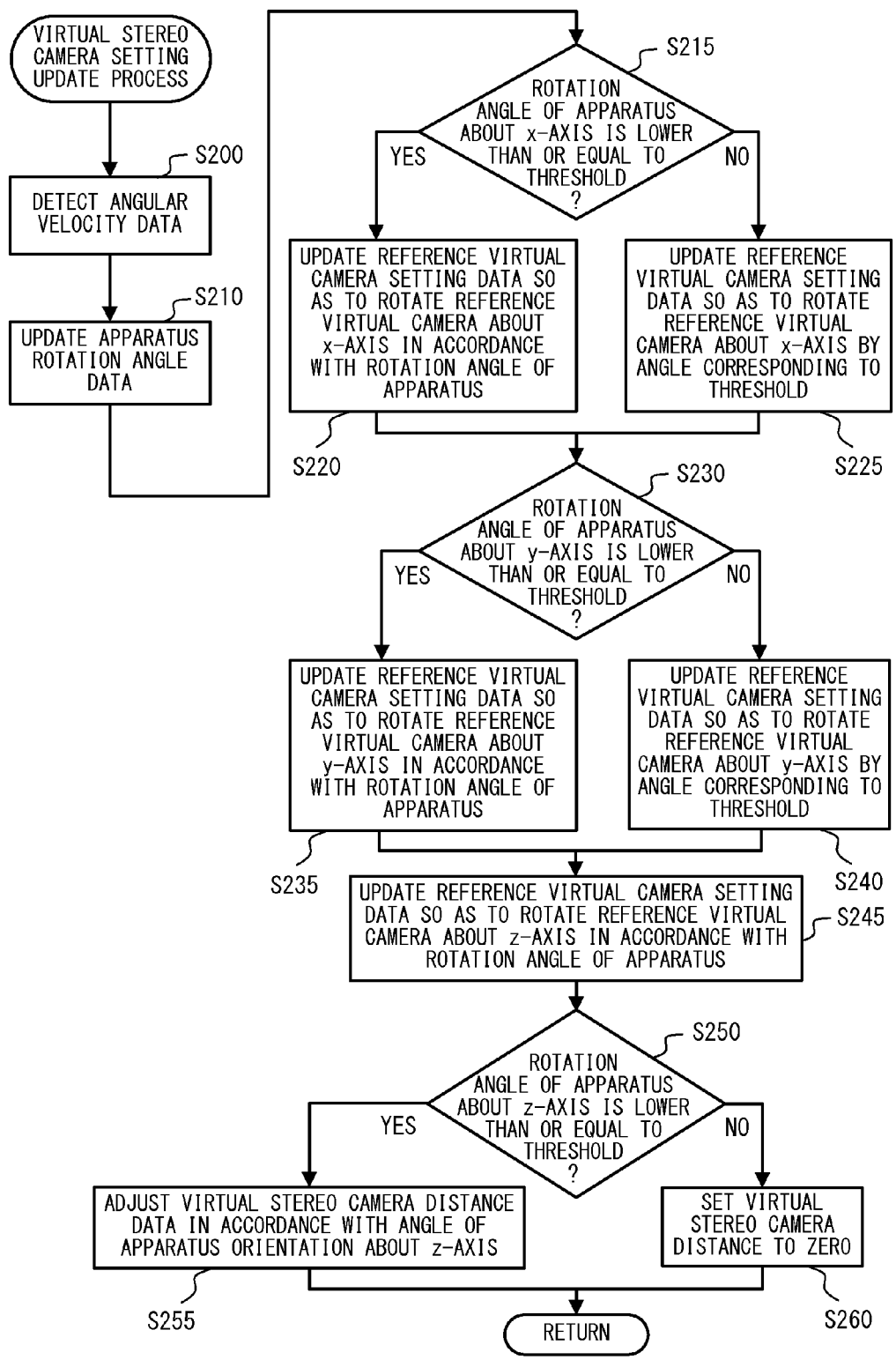
FIG. 8 shows a non-limiting example of a flow chart of a display control process performed by a CPU of a game apparatus according to the exemplary embodiment executing an information processing program.

In the following, a specific operation of information processing in the exemplary embodiment will be described with reference to FIG. 7 and FIG. 8. Firstly, when the game apparatus is powered on, a boot program (not shown) is executed by the CPU 311. Thus, the game program stored in the internal data storage memory is loaded and stored in the main memory 32. The game program stored in the main memory 32 is executed by the CPU 311, thereby performing the process shown in flow charts of FIG. 7 and FIG. 8. FIG. 7 and FIG. 8 are flow charts each showing a series of processes performed in a unit time (e.g., at intervals of 1/60 sec) as an example of the game process which is performed by the CPU 311 executing the game program. In FIG. 7 and FIG. 8, step is abbreviated as "S".

When the game process is started, the CPU 311 firstly performs an initialization process (step 10). Specifically, the CPU 311 sets various data stored in the main memory 32 to default values.

When the initialization process is completed, the CPU 311 performs a game operation input reception process (step 105). Specifically, the CPU 311 recognizes an input state of each of the analog stick 15 and the operation buttons 14A to 14E of the game apparatus.

When the game operation input reception process is completed, the CPU 311 performs a player object position and orientation update process (step 110). Specifically, the CPU 311 updates the position and the orientation of the player object in the virtual space based on the input state of the analog stick 15 or the like, and updates the player object position and orientation data 501.

When the player object position and orientation update process is completed, the CPU 311 performs a reference virtual camera setting process (step 115). Specifically, the CPU 311 firstly obtains the position and the orientation of the player object with reference to the player object position and orientation data 501. Then, based on the obtained position and the orientation of the player object, the CPU 311 sets the position and the orientation of the reference virtual camera. More specifically, the CPU 311 determines, as a position (coordinates of the originating point of the reference virtual camera coordinate system) of the reference virtual camera, a position at a predetermined distance behind and above the player object 310 with respect to a direction in which the player object faces. Further, the CPU 311 determines the orientation (directions of the respective axes of the reference virtual camera coordinate system) of the reference virtual camera such that the direction facing the position of the player object 310 from the determined position of the reference virtual camera becomes the viewing direction of the reference virtual camera. The CPU 311 updates the reference virtual camera setting data 502 so s to represent the setting of the reference virtual camera having been determined as described above. The determined orientation of the reference virtual camera is a reference orientation for updating the orientation of the reference virtual camera in the succeeding processing.

When the reference virtual camera setting process is completed, the CPU 311 performs a virtual camera distance setting process and sets a virtual stereo camera distance that serves as a reference (step 120). In the exemplary embodiment, a distance predetermined by the game program is used as the virtual stereo camera distance serving as the reference, the virtual stereo camera distance data is updated so as to be the predetermined distance. In another embodiment, for example, the virtual camera distance serving as the reference may be changed in accordance with an operation by the user.

When the virtual camera distance setting process is completed, the CPU 311 determines whether an input of the activation operation is in an ON state (step 125). Specifically, it is determined whether an input of the R button 14K, which is a user's operation assigned as the activation operation, is in the ON state (whether the R button 14K is being pressed). When it is determined that the input of the activation operation is in the ON state (YES in step 125), the CPU 311 proceeds the processing to step 125. Otherwise (NO in step 125), the CPU 311 proceeds the processing to step 145.

When the CPU 311 determines that the input of the activation operation is in the ON state in step 125, the CPU 311 further determines whether the input of the activation operation is switched from an OFF state to the ON state (step 130). In other words, the CPU 311 determines whether the input of the activation operation is switched to the ON state at the current timing, or switched to the ON state at the previous timing and has been in the ON state since. When the CPU 311 determines that the input of the activation operation is switched to the ON state at the current timing (YES in step 130), the CPU 311 proceeds the processing to step 135. When the CPU 311 determines that the input of the activation operation has been in the ON state (NO in step 130), the CPU 311 proceeds the processing to step 140.

When having determined that the input of the activation operation is switched to the ON state at the current timing in step 130, the CPU 311 performs an apparatus rotation angle data initialization process (step 135). Specifically, the CPU 311 updates the apparatus rotation angle data 504 so that respective rotation angle data relative to the x-axis, the y-axis, and the z-axis of the game apparatus become zero. With this process, in the subsequent virtual stereo camera setting update process, the rotation angle of the game apparatus is obtained based on the orientation of the game apparatus when the input of the activation operation input is activated.

When the apparatus orientation data initialization process is completed or when it is determined that the input of the activation operation has been in the ON state in step 130, the CPU 311 performs the virtual stereo camera setting update process (step 140). In the following, the virtual stereo camera setting update process will be described in detail with reference to the process flow of FIG. 8.

In the virtual stereo camera setting update process, the CPU 311 firstly performs an angular velocity data detection process (step 200). Specifically, the CPU 311 obtains respective angular velocities in the x-axis, y-axis, and z-axis directions sampled by the angular velocity sensor 40.

When the angular velocity data detection process is completed, the CPU 311 performs an apparatus rotation angle data update process (step 210). Specifically, based on the angular velocity data detected in step 200, the CPU 311 calculates respective angles about the x-axis, y-axis, and z-axis at which the game apparatus is rotated. Then, the CPU 311 adds the calculated angles to the immediately previous apparatus rotation angles (the rotation angles about the x-axis, y-axis, and z-axis based on the apparatus reference orientation), respectively, which have been obtained with reference to the apparatus rotation angle data 504 before being updated. Thereby, current apparatus rotation angles are calculated. The CPU 311 updates the apparatus rotation angle data 504 so as to represent the calculated apparatus rotation angles.

When the apparatus rotation angle data update process is completed, the CPU 311 updates the orientation of the reference virtual camera based on the updated apparatus rotation angle data 504 (steps 215 to 245). In the following, a flow of updating the orientation of the reference virtual camera will be described.

Firstly, with reference to the rotation angle of the game apparatus about the x-axis obtained from the updated apparatus rotation angle data 504, the CPU 311 determines whether the rotation angle about the x-axis is lower than or equal to a threshold obtained with reference to the x-axis threshold data 505 (step 215). When the rotation angle of the game apparatus about the x-axis is lower than or equal to the threshold (YES in step 215), the CPU 311 rotates the reference virtual camera in the x-axis direction in accordance with the rotation angle of the game apparatus (step 220). More Specifically, with reference to the reference virtual camera setting data 502, the CPU 311 obtains the position and the orientation of the reference virtual camera set in step S115, and rotates the reference virtual camera, from the obtained orientation, about the x-axis in the reference virtual camera coordinate system, by an angle corresponding to the rotation angle of the game apparatus about the x-axis. The CPU 311 updates the reference virtual camera setting data 502 so as to represent the orientation of the rotated reference virtual camera. When the rotation angle of the game apparatus about the x-axis is higher than the threshold (NO in step 215), if the virtual camera is rotated by an angle corresponding to the rotation angle of the game apparatus about the x-axis, the player object may deviate from the viewing angle of the reference virtual camera. For this reason, the virtual camera is rotated by an angle corresponding to the rotation angle about the x-axis set as the threshold instead of being rotated by the angle corresponding to the rotation angle of the game apparatus about the x-axis. Then, the CPU 311 updates the reference virtual camera setting data 502 so as to represent the orientation of the rotated reference virtual camera (step 225). Thus, the reference virtual camera is rotated up to the angle set as the threshold, thereby the player object is always displayed on the screen. In the description above and below, the threshold and the rotation angle are compared in a case where both of the threshold and the rotation angle are positive values. However, in reality, based on a reference position, a rotation angle in one direction is represented by a positive value, and a rotation angle in a direction opposite to the one direction is represented by a negative value. Furthermore, it is checked whether the rotation angle is within the threshold also with respect to the rotation angle in the negative direction. An absolute value of the threshold for the positive direction may be set to be equal to or different from an absolute value of the threshold for the negative direction.

When the reference virtual camera setting data 502 relative to the x-axis has been updated, the CPU 311 performs, for the rotation angle about the y-axis, processes similar to the processes (steps 230 to 240) for the rotation angle about the x-axis. That is, the CPU 311 rotates the reference virtual camera about the y-axis of the reference virtual camera coordinate system by an angle corresponding to the rotation angle of the game apparatus about the y-axis or by the rotation angle about the y-axis set as the threshold. Then, the CPU 311 updates the reference virtual camera setting data 502. These processes are similar to those in the case of the x-axis direction, and thus a detailed description thereof is omitted here.

When the reference virtual camera setting data 502 relative to the y-axis has been updated, the CPU 311 updates the reference virtual camera setting data 502 relative to the rotation angle about the z-axis (step 245). Specifically, the CPU 311 rotates the orientation of the reference virtual camera, by an angle corresponding to the rotation angle of the game apparatus about the z-axis, by rotating the reference virtual camera about the z-axis in the reference virtual camera coordinate system. Then, the CPU 311 updates the reference virtual camera setting data 502. Unlike the rotation angle about the x direction or the y direction, the viewing direction (the z-axis direction in the reference virtual camera coordinate system) of the reference virtual camera faces substantially in the direction of the player object. Consequently, the player object will be always displayed on the screen even if the reference virtual camera is rotated by any angle about the z-axis in the reference virtual camera coordinate system. Accordingly, the orientation of the reference virtual camera about the z-axis is updated without determining whether the rotation angle is higher than the threshold.

As described above, the orientation of the reference virtual camera is changed and the reference virtual camera setting data 502 is updated through the processes of steps 215 to 245.

When the reference virtual camera setting data 502 has been updated, the CPU 311 updates the virtual stereo camera distance data 503 (steps 250 to 260). In the following, a flow of updating the virtual stereo camera distance data 503 will be described.

Firstly, with reference to the rotation angle of the game apparatus about the z-axis obtained from the updated apparatus rotation angle data 504, the CPU 311 determines whether the rotation angle about the z-axis is lower than or equal to the threshold obtained with reference to the z-axis threshold data 507 (step 250). When the rotation angle of the game apparatus about the z-axis is lower than or equal to the threshold (YES in step 250), the CPU 311 adjusts the virtual stereo camera distance in accordance with the rotation angle of the game apparatus about the z-axis (step 255). Specifically, the reference value of the virtual stereo camera distance obtained with reference to the reference distance data 508 is reduced in accordance with the rotation angle of the apparatus orientation about the z-axis. More specifically, the reference value is set so that the rotation angle of the apparatus orientation about the z-axis of 0 degrees corresponds to 100% of the reference value and the rotation angle equal to the z-axis threshold corresponds to 0% of the reference value. The CPU 311 updates the virtual stereo camera distance data 503 so as to represent the value of the virtual stereo camera distance. When the rotation angle of the game apparatus about the z-axis is higher than the z-axis threshold (NO in step 250), the CPU 311 updates the virtual stereo camera distance data 503 so that the virtual stereo camera distance becomes zero (step 260).

As described above, the virtual stereo camera distance data 503 is updated through the processes of steps 250 to 260. When the virtual stereo camera distance data 503 has been updated, the CPU 311 ends the virtual stereo camera setting update process and returns the processing to step 145 in the previous process flow of FIG. 7.

When the virtual stereo camera setting update process is completed, and when it is determined that the input of the activation operation is not switched to the ON state in step 125, the CPU 311 performs a virtual stereo camera positioning process (step 145).

When the virtual stereo camera positioning process is completed, the CPU 311 captures the virtual space by means of the positioned right virtual camera and the left virtual camera, generates an image for a right eye and an image for a left eye, and displays the generated images on the display means (step 150).

Figure 9:
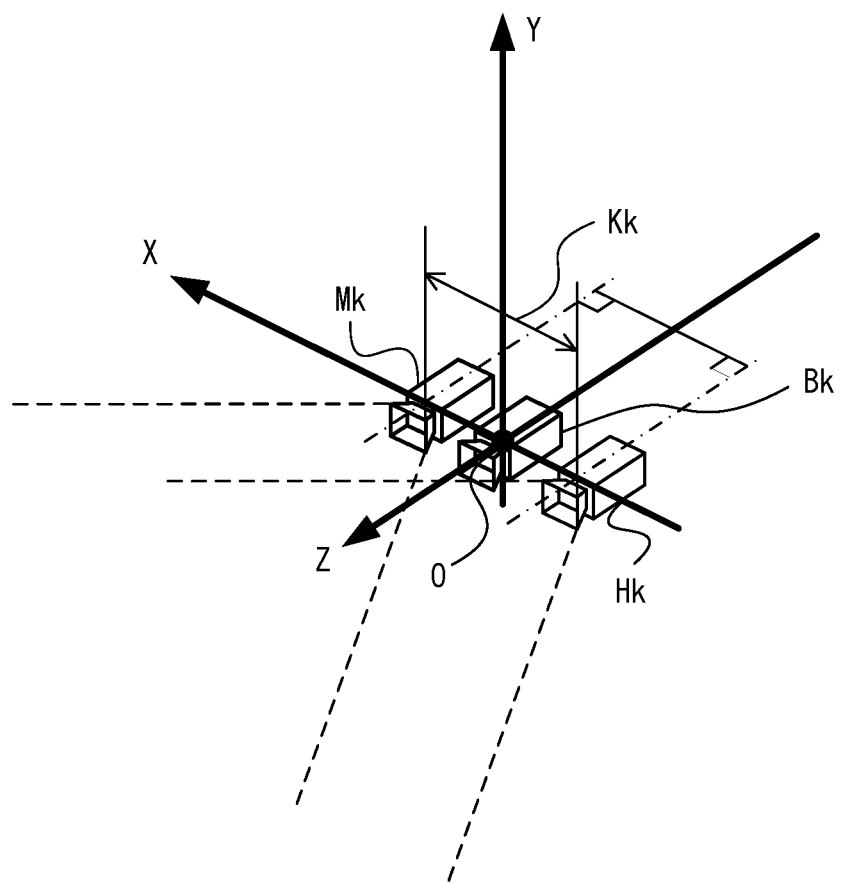
FIG. 9 shows a non-limiting example of a positioning method of a virtual stereo camera according to the exemplary embodiment.

FIG. 9 shows how the virtual stereo camera is positioned. The CPU 311 firstly obtains a setting of a reference virtual camera Bk with reference to the reference virtual camera setting data 502. Further, the CPU 311 obtains a virtual stereo camera distance Kk with reference to the virtual stereo camera distance data 503. Then, as shown in FIG. 9, the CPU 311 moves the reference virtual camera, from an originating point O in the reference virtual camera coordinate system, in an x-axis positive direction, so as to be spaced from the originating point O by a distance Kk/2 and positioned as a right virtual camera Mk. At the same time, the CPU 311 moves the reference virtual camera, from the originating point O in the reference virtual camera coordinate system, in an x-axis negative direction, so as to be spaced from the originating point O by the distance Kk/2 and positioned as a left virtual camera Hk. The viewing direction of the left virtual camera Hk and the viewing direction of the right virtual camera Mk are parallel to each other.

When the process of generating and displaying the image for a right eye and the image for a left eye is completed, the CPU 311 determines whether an operation for ending the game process has been performed by the user (step 155). When the CPU 311 determines that an operation for ending the game process has been performed (YES in step 155), the CPU 311 ends the execution of the game program. When the CPU 311 determines that an operation for ending the game process has not been performed by the user (NO in step 155), the CPU 311 repeats the processing from step 105.

The game apparatus 10 according to the exemplary embodiment has been described above. The game apparatus 10 according to the exemplary embodiment can reduce a parallax of images in accordance with a magnitude of displacement, generated by the user rotating the game apparatus 10 about the z-axis (in the roll direction), between the viewing direction of the user and the optimal direction for viewing a stereoscopic image, thereby improving visibility.

In the exemplary embodiment, a case has been described in which the rotation angle about the z-axis (in the roll direction) is compared with the threshold set to 25 degrees. However, the threshold may be set to any degrees.

Furthermore, in the above-description, the exemplary embodiment is applied to the hand-held game apparatus 10. However, the exemplary embodiment is not limited thereto. The exemplary embodiment is applicable to a stationary game apparatus and a mobile information terminal such as a mobile phone, a personal handy-phone system (PHS), and a PDA. Moreover, the exemplary embodiment is applicable to a stationary game device and a personal computer.

While the exemplary embodiment has been described in detail, the foregoing description is in all aspects illustrative and not restrictive. It is understood that numerous other modifications and variations can be devised without departing from the scope of the exemplary embodiment. It is also understood that the one skilled in the art can implement the exemplary embodiment in the equivalent range based on the description of the present specification, and the common technological knowledge. Further, it should be understood that the terms used in the present specification have meanings generally used in the art unless otherwise specified. Therefore, unless otherwise defined, all the jargons and technical terms used in the present specification have the same meanings as those generally understood by one skilled in the art. In the event of any contradiction, the present specification (including the definitions) precedes.

The image generation program, the image generation apparatus, the image generation system, and the image generation method according to the exemplary embodiment are useful as an image generation program, an image generation apparatus, an image generation system, an image generation method, and the like which can improve visibility.

What is claimed is:

1. A non-transitory computer-readable storage medium having stored therein an image generation program which, when executed by a computer of a display device including a display for displaying a stereoscopically visible image, causes the computer to at least:
    set a virtual stereo camera, comprising right and left virtual cameras, in a virtual space;
    obtain a stereoscopically visible image by using the virtual stereo camera;
    receive an activation operation and activating, based on the activation operation, camera control for controlling an orientation of the virtual stereo camera in accordance with an orientation of the display;
    obtain, based on a reference orientation, which is the orientation of the display when the camera control is activated, a change amount of the orientation of the display from the reference orientation as a display orientation change amount;
    control the orientation of the virtual stereo camera based on the display orientation change amount; and
    control, based at least on a directional component in a roll direction of the display orientation change amount, a separation between the right and left virtual cameras of the virtual stereo camera, wherein
    when the directional component in the roll direction remains less than or equal to a threshold value, the separation is continuously adjusted within a range between a maximum separation and a minimum separation so that as the directional component in the roll direction increases, a degree of stereoscopic effect of the image obtained by using the virtual stereo camera decreases, and
    when the directional component in the roll direction exceeds the threshold value, the separation is controlled to be the minimum separation.

2. The storage medium according to claim 1, wherein the separation between the right and left virtual cameras of the virtual stereo camera is controlled so that the degree of stereoscopic effect becomes zero when the directional component in the roll direction of the display orientation change amount exceeds the threshold value.

3. The storage medium according to claim 1, wherein the image generation program further causes the computer to move an object based on a user operation, wherein
    a position of the virtual stereo camera is set based on a position of the moved object.

4. The storage medium according to claim 3, wherein the object is moved also when the camera control is activated.

5. The storage medium according to claim 3, wherein a change amount of the orientation of the virtual stereo camera is limited.

6. A hand-held image generation apparatus including a display, the image generation apparatus comprising:
    a virtual stereo camera setting unit which sets a virtual stereo camera, comprising right and left virtual cameras, in a virtual space;
    an image obtaining unit which obtains a stereoscopically visible image by using the virtual stereo camera;
    an activation unit which receives an activation operation and activates, based on the activation operation, camera control for controlling an orientation of the virtual stereo camera in accordance with an orientation of the display;
a display orientation change amount obtaining unit which obtains, based on a reference orientation, which is the orientation of the display when the camera control is activated, a change amount of the orientation of the display from the reference orientation as a display orientation change amount;
a virtual stereo camera orientation control unit which controls the orientation of the virtual stereo camera based on the display orientation change amount; and
a stereoscopic effect degree adjusting unit which controls, based at least on a directional component in a roll direction of the display orientation change amount, a separation between the right and left virtual cameras of the virtual stereo camera, wherein
when the directional component in the roll direction remains less than or equal to a threshold value, the separation is continuously adjusted within a range between a maximum separation and a minimum separation so that as the directional component in the roll direction increases, a degree of stereoscopic effect of the image obtained by using the virtual stereo camera decreases, and
when the directional component in the roll direction exceeds the threshold value, the separation is controlled to be the minimum separation.

7. An image generation method to be executed by a computer of a display device including a display for displaying a stereoscopically visible image, the image generation method comprising:
setting a virtual stereo camera, comprising right and left virtual cameras, in a virtual space;
obtaining a stereoscopically visible image by using the virtual stereo camera;
receiving an activation operation and activating, based on the activation operation, camera control for controlling an orientation of the virtual stereo camera in accordance with an orientation of the display;
obtaining, based on a reference orientation, which is the orientation of the display when the camera control is activated, a change amount of the orientation of the display from the reference orientation as a display orientation change amount;
controlling the orientation of the virtual stereo camera based on the display orientation change amount; and
controlling, based at least on a directional component in a roll direction of the display orientation change amount, a separation between the right and left virtual cameras of the virtual stereo camera, wherein
when the directional component in the roll direction remains less than or equal to a threshold value, the separation is continuously adjusted within a range between a maximum separation and a minimum separation so as the directional component in the roll direction increases, a degree of stereoscopic effect of the image obtained by using the virtual stereo camera decreases, and
when the directional component in the roll direction exceeds the threshold value, the separation is controlled to be the minimum separation.

8. A hand-held image generation system including a display, the image generation system comprising:
a virtual stereo camera setting unit which sets a virtual stereo camera, comprising right and left virtual cameras, in a virtual space;
an image obtaining unit which obtains a stereoscopically visible image by using the virtual stereo camera;
an activation unit which receives an activation operation and activates, based on the activation operation, camera control for controlling an orientation of the virtual stereo camera in accordance with an orientation of the display;
a display orientation change amount obtaining unit which obtains, based on a reference orientation, which is the orientation of the display when the camera control is activated, a change amount of the orientation of the display from the reference orientation as a display orientation change amount;
a virtual stereo camera orientation control unit which controls the orientation of the virtual stereo camera based on the display orientation change amount; and
a stereoscopic effect degree adjusting unit which controls, based at least on a directional component in a roll direction of the display orientation change amount, a separation of the right and left virtual cameras of the virtual stereo camera, wherein
when the directional component in the roll direction remains less than or equal to a threshold value, the separation is continuously adjusted within a range between a maximum separation and a minimum separation so that as the directional component in the roll direction increases, a degree of stereoscopic effect of the image obtained by using the virtual stereo camera decreases, and
when the directional component in the roll direction exceeds the threshold value, the separation is controlled to be the minimum separation.

9. An information processing system comprising:
a stereoscopic display;
a sensor for sensing aspects of an orientation of the stereoscopic display;
a user control; and
processing circuitry, including a processor, for generating images of a three-dimensional virtual space for display on the stereoscopic display, the processing circuitry being configured to set left and right virtual cameras in the virtual space; obtain left and right images by using the left and right virtual cameras; receive an activation input supplied to the user control and activate, based on the activation input, camera control for controlling orientations of the left and right virtual cameras in accordance with the sensed orientation of the stereoscopic display; obtain display orientation changes based on the sensed orientations of the stereoscopic display and a reference orientation; control the orientations of the left and right virtual cameras based on the display orientation changes; and control, based at least on a directional component in a roll direction of the display orientation changes, a separation between the left and right virtual cameras, wherein
when the directional component in the roll direction remain less than or equal to a threshold value, the separation is continuously adjusted within a range between a maximum separation and a minimum separation so that as the directional component in the roll direction increases, a degree of stereoscopic effect of the image obtained by using the virtual stereo camera decreases, and
when the directional component in the roll direction exceeds the threshold value, the separation is controlled to be the minimum separation.

10. The information processing system according to claim 9, wherein positions and orientations of the left and right virtual cameras in the virtual space are determined based on position and orientation of an object in the virtual space.

11. The information processing system according to claim 9, wherein the reference orientation corresponds to the sensed orientation of the display when the camera control is activated.

12. The information processing system according to claim 9, wherein the parallax between the left and right images becomes zero when the directional component in the roll direction of the display orientation changes exceeds the threshold value.

13. The information processing system according to claim 9, wherein, when the camera control is deactivated, orientations of the left and right virtual cameras automatically return to orientations at the time when the camera control is activated.

14. The information processing system according to claim 9, wherein the activation input for activating camera control comprises a button press.

15. The information processing system according to claim 9, wherein the processing circuitry further receives a deactivation input for deactivating camera control.

16. The information processing system according to claim 15, wherein the activation input comprises a button press and the deactivation input comprises a button release.

17. The information processing system according to claim 9, wherein orientation changes of the left and right virtual cameras in a tilt direction and a pan direction are limited to respective specified ranges.

18. The information processing system according to claim 9, wherein orientation changes of the left and right virtual cameras in a tilt direction and a pan direction, but not the roll direction, are limited to respective specified ranges.

19. The information processing system according to claim 9, wherein the sensor comprises an accelerometer.

20. The information processing system according to claim 9, wherein the sensor comprises an angular velocity sensor.

21. The information processing system according to claim 9, wherein the sensor comprises an accelerometer and an angular velocity sensor.

22. The information processing system according to claim 9, embodied as a mobile phone.

23. The information processing system according to claim 9, embodied as a handheld system for playing games.

* * * * *